US012613338B2

(12) United States Patent
Wang

(10) Patent No.: US 12,613,338 B2
(45) Date of Patent: Apr. 28, 2026

(54) NON-SOLID MATERIAL DETECTION METHOD, NON-SOLID MATERIAL DETECTION DEVICE, DISTANCE COMPUTING DEVICE, DISTANCE COMPUTING METHOD

(71) Applicant: PixArt Imaging Inc., Hsin-Chu City (TW)

(72) Inventor: Guo-Zhen Wang, Hsin-Chu City (TW)

(73) Assignee: PixArt Imaging Inc., Hsin-Chu City (TW)

(*) Notice: Subject to any disclaimer, the term of this patent is extended or adjusted under 35 U.S.C. 154(b) by 1044 days.

(21) Appl. No.: 17/724,509

(22) Filed: Apr. 20, 2022

(65) Prior Publication Data

US 2023/0341551 A1     Oct. 26, 2023

(51) Int. Cl.
*G01S 17/08*        (2006.01)
*A47L 9/00*         (2006.01)
*A47L 9/28*         (2006.01)
*G01S 7/481*        (2006.01)
*G06V 20/58*        (2022.01)

(52) U.S. Cl.
CPC .............. *G01S 17/08* (2013.01); *A47L 9/009* (2013.01); *A47L 9/2805* (2013.01); *G01S*

*7/4816* (2013.01); *G06V 20/58* (2022.01); *A47L 2201/04* (2013.01)

(58) Field of Classification Search
None
See application file for complete search history.

(56) References Cited

U.S. PATENT DOCUMENTS

| | | | |
|---|---|---|---|
| 2019/0094346 A1* | 3/2019 | Dumoulin | ............... G01S 17/42 |
| 2021/0103055 A1* | 4/2021 | Allen | ...................... G01S 17/10 |
| 2021/0383269 A1* | 12/2021 | Zhou | ................... G05D 1/0257 |

* cited by examiner

*Primary Examiner* — Luke D Ratcliffe
(74) *Attorney, Agent, or Firm* — Winston Hsu

(57) ABSTRACT

A non-solid material detection device, comprising: a processing circuit; an image sensor; a first light source, configured to emit first light following a first direction; a second light source, configured to emit second light following a second direction. If the non-solid material detection device is located on the surface, the first direction is toward a surface and the second direction is leaving or parallel with the surface. The processing circuit determines an obstacle based on a second sensing image generated according to the second light and determines non-solid material based on a first sensing image generated according to the first light. The present invention also discloses a distance computing device. Via the present invention, the non-solid material detection and the distance computing can be more accurate.

12 Claims, 12 Drawing Sheets

D>Dt2

D<Dt1

NON-SOLID MATERIAL DETECTION METHOD, NON-SOLID MATERIAL DETECTION DEVICE, DISTANCE COMPUTING DEVICE, DISTANCE COMPUTING METHOD

BACKGROUND OF THE INVENTION

1. Field of the Invention

The present invention relates to a non-solid material detection method/device and a distance computing method/device, and particularly relates to a non-solid material detection method/device which can distinguish non-solid material and obstacles, and a distance computing method/device which can accurately compute a distance between an object and the distance computing device even when the distance computing device is close to the object.

2. Description of the Prior Art

An autonomous cleaning device (e.g., a robot cleaner) becomes more and more popular recently. The autonomous cleaning device can determine a location thereof and accordingly performs a clean action. However, a conventional autonomous cleaning device always has no function of detecting liquid, thus may still perform the clean action to the liquid even if the autonomous cleaning device does not have the ability of cleaning the liquid. Such operation may cause some inconvenience to the user. For example, the autonomous cleaning device is a vacuum cleaner but still try to clean the liquid and the colloid. Such operation may cause the environment surrounding it to be more terrible.

Besides, an autonomous cleaning device always has a distance computing mechanism for computing a distance between it and an obstacle such as a wall or furniture. Thereby the autonomous cleaning device can perform obstacle avoidance when it is close to the obstacle. However, a conventional autonomous could not accurately compute the distance when it is close to the obstacle. For example, if autonomous cleaning device uses a TOF (Time of flight) image sensor, the shortest distance it can compute is limited by the characteristics of the TOF image sensor.

SUMMARY OF THE INVENTION

One objective of the present invention is to provide a non-solid material detection device which can accurately detect non-solid material such as liquid or colloid.

Another objective of the present invention is to provide a non-solid material detection method which can accurately detect non-solid material such as liquid or colloid.

Still another objective of the present invention is to provide a distance computing device which can accurately compute a distance between it and an obstacle.

Still another objective of the present invention is to provide a distance computing method which can accurately compute a distance between it and an obstacle.

One embodiment of the present invention discloses a non-solid material detection device, comprising: a processing circuit; an image sensor; a first light source, configured to emit first light following a first direction; and a second light source, configured to emit second light following a second direction. The processing circuit is configured to perform following steps: controlling the image sensor to sense a first sensing image generated according to reflected light of the first light; controlling the image sensor to sense a second sensing image generated according to reflected light of the second light; computing an obstacle region in the second sensing image; and computing a non-solid material region in the first sensing image without computing a region of the first sensing image which corresponds to the obstacle region.

Another embodiment of the present invention discloses a non-solid material detection device, comprising: a processing circuit; an image sensor; a first light source, configured to emit first light following a first direction; a second light source, configured to emit second light following a second direction. If the non-solid material detection device is located on the surface, the first direction is toward a surface and the second direction is leaving the surface or parallel with the surface. The processing circuit determines an obstacle based on a second sensing image generated according to the second light and determines non-solid material based on a first sensing image generated according to the first light.

Still another embodiment of the present invention discloses a distance computing device, comprising: a surface light source, configured to emit surface light; a line light source, configured to emit line light; an image sensor, configured to sense first sensing images generated according to reflected light of the surface light, and to sense second sensing images generated according to reflected light of the line light; and a processing circuit, configured to compute a distance between the distance computing device and an obstacle according to the first sensing images or the second sensing images.

A non-solid material detection method and a distance computing method can be acquired in view of above-mentioned embodiments.

In view of above-mentioned embodiments, the liquid detection can be more accurate. Also, the distance can also be accurately computed even if the autonomous cleaning device is close to the obstacle.

These and other objectives of the present invention will no doubt become obvious to those of ordinary skill in the art after reading the following detailed description of the preferred embodiment that is illustrated in the various figures and drawings.

DETAILED DESCRIPTION

In the following descriptions, several embodiments are provided to explain the concept of the present application. It will be appreciated that the system, the device, the apparatus or the module depicted in following embodiments can be implemented by hardware (ex. circuit) or the combination of hardware and software (ex. a processing unit executing at least one program). The term "first", "second", "third" in following descriptions are only for the purpose of distinguishing different one elements, and do not mean the sequence of the elements. For example, a first device and a second device only mean these devices can have the same structure but are different devices.

In following embodiments, the existence of liquid can be determined according to spreading level of the light. For more detail, if the light is emitted to an obstacle, such as furniture or a wall, most of the light is reflected or absorbed, thus the image formed by the light has a narrower shape. On the contrary, if the light is emitted to liquid, the light is spread since the liquid has light guide ability, thus the image has a wider shape. Details of liquid detection are expressed in a related US application with an application Ser. No. 17/393,424. Please note, in following embodiments, an autonomous cleaning device which can detect liquid is provided as an example for explaining, but does not mean to limit the scope of the present invention. The disclosed liquid detection mechanism can be provided to detect other non-solid material such as colloid. Also, the following embodiments can be applied to any other device for non-solid material detection rather than limited to an autonomous cleaning device.

Figure 1:
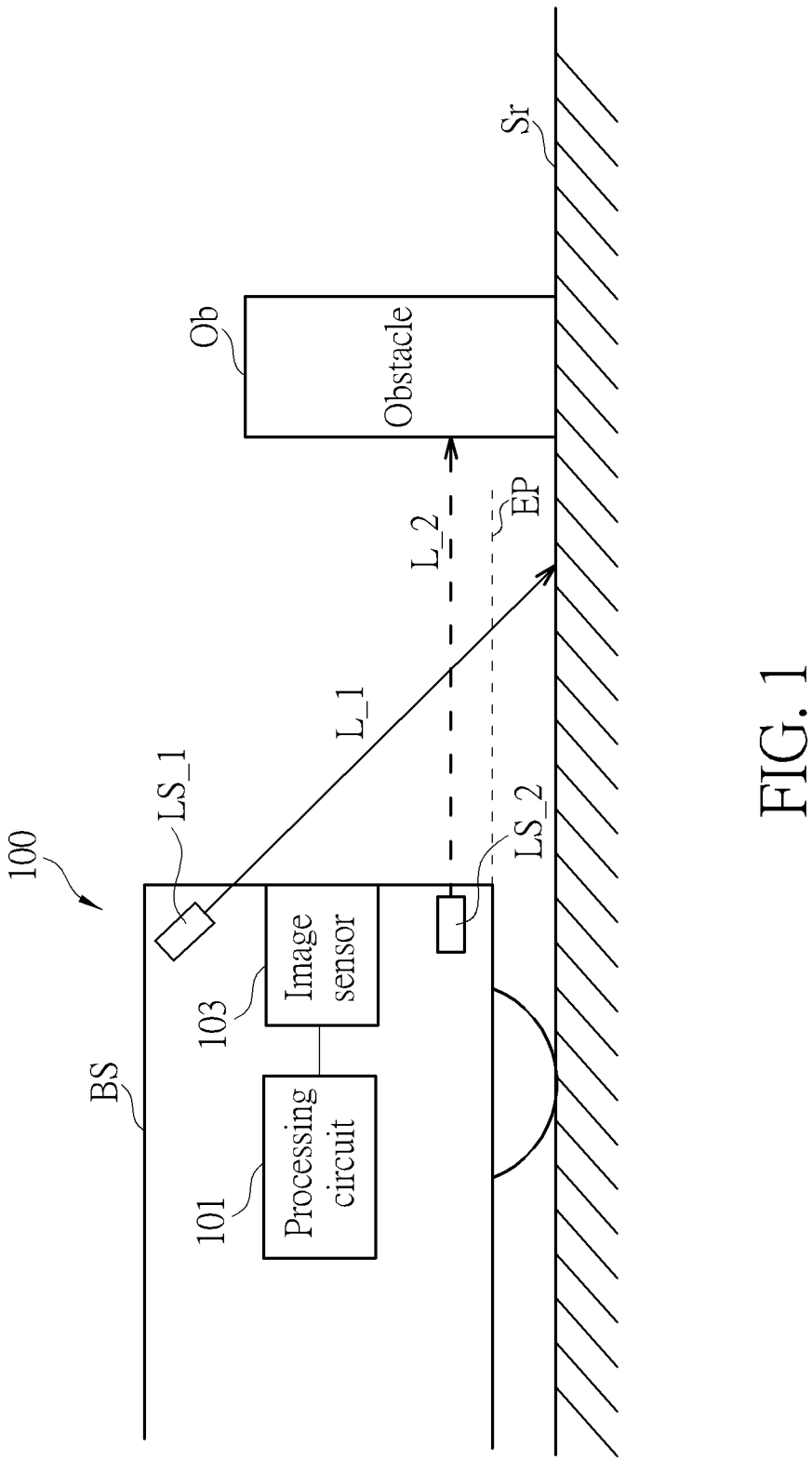
FIG. 1 is a schematic diagram illustrating an autonomous cleaning device according to one embodiment of the present invention.

However, in some scenarios, some obstacles (or named objects) may also have high light guide ability, thus the autonomous cleaning device may also determine these obstacles as liquid. Therefore, the present invention provides a new liquid determining mechanism for solving such problem. FIG. 1 is a schematic diagram illustrating an autonomous cleaning device according to one embodiment of the present invention. As illustrated in FIG. 1, the autonomous cleaning device 100 comprises a processing circuit 101, an image sensor 103, a first light source LS_1 and a second light source LS_2. In one embodiment, the processing circuit 101 is integrated to the image sensor 103. The first light source LS_1 is configured to emit first light L_1 following a first direction, and the second light source LS_2 is configured to emit second light L_2 following a second direction. In the embodiment of FIG. 1, the second light L_2 is parallel with a surface Sr (e.g., the ground), which the autonomous cleaning device 100 locates on. Also, in the embodiment of FIG. 1, the first direction is toward the surface Sr. Please note, in one embodiment, the autonomous cleaning device 100 comprises a bottom surface BS. The emission direction of the first light L_1 is toward an extension plane of the bottom surface BS, and the emission direction of the second light L_2 is parallel an extension plane EP of the bottom surface BS. In another embodiment, the emission direction of the second light LS_2 is leaving an extension plane EP of the bottom surface BS. Please note, the surface Sr is a ground in the embodiments of the present invention. However, the surface ground can be any working surface which the autonomous cleaning device 100 locates on.

Furthermore, the image sensor 103 is located at a location that the image sensor 103 can sense reflected light of the first light L_1 and the second light L_2. In the embodiment of FIG. 1, the first light source LS_1 is above the image sensor 103 and the second light source LS_2 is below the image sensor 103.

The processing circuit 101 controls the image sensor 103 to sense a first sensing image generated according to reflected light of the first light L_1, and controls the image sensor 103 to sense a second sensing image generated according to reflected light of the second light L_2. The processing circuit 101 determines an obstacle Ob based on the second sensing image generated and determines liquid based on the first sensing image. For more detail, the processing circuit 101 computes an obstacle region in the second sensing image, and computes a liquid region in the first sensing image without computing a region of the first sensing image which corresponds to the obstacle region. Detail about the obstacle region and the liquid region will be described later.

Figure 2A:
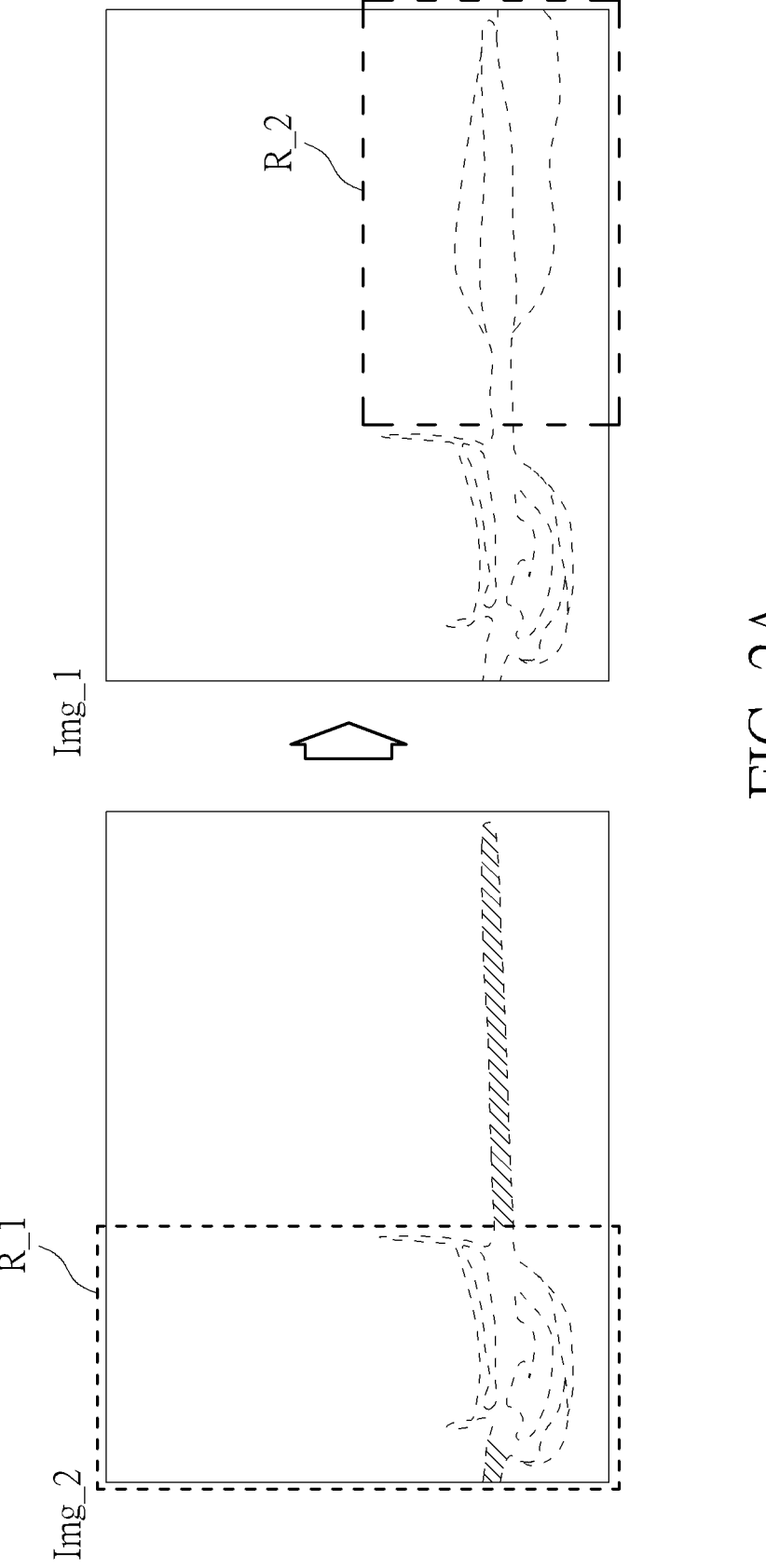
FIG. 2A and FIG. 2B are schematic diagrams illustrating how to determine an object and liquid, according to embodiments of the present invention.
Figure 2B:
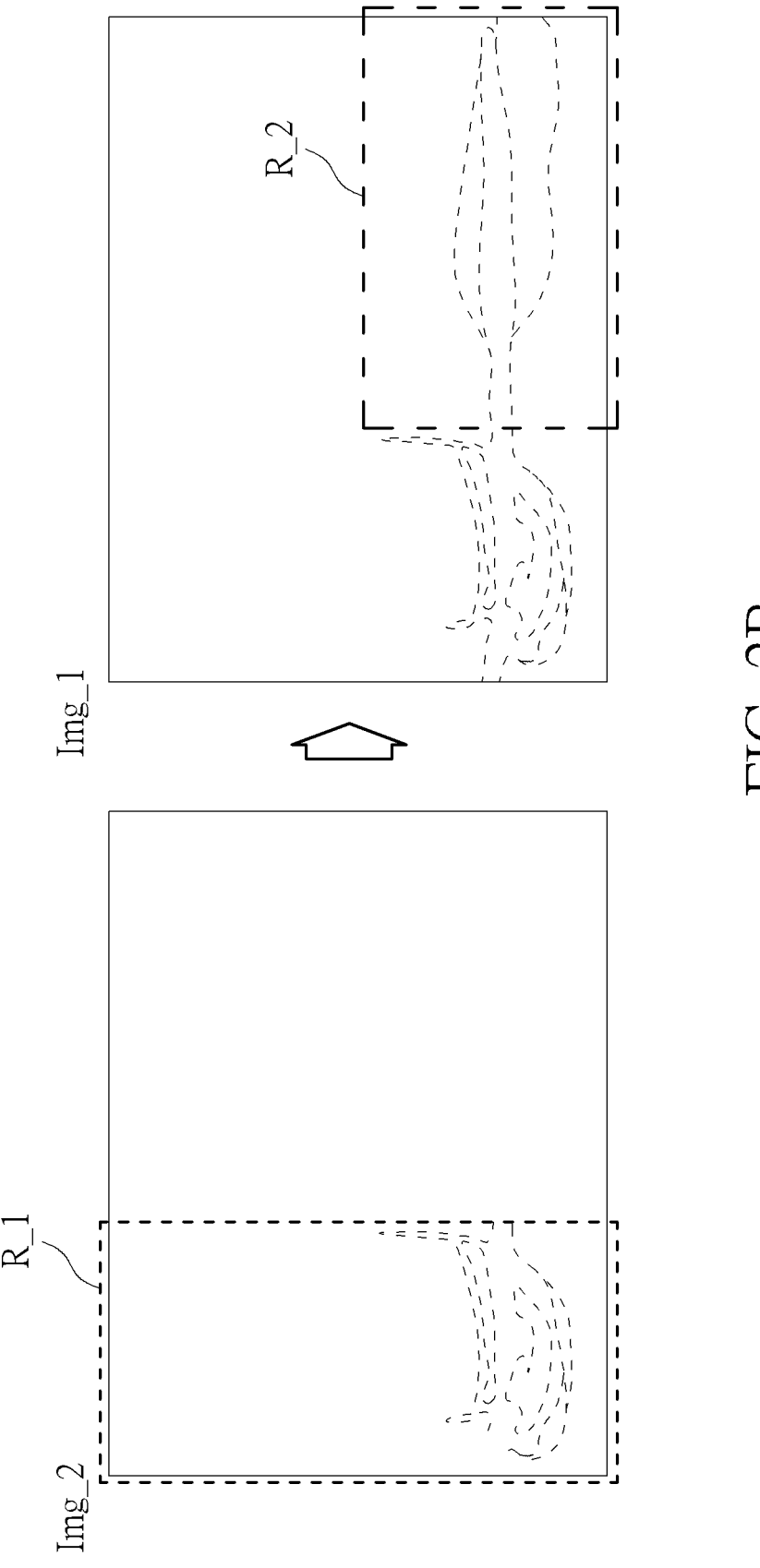

FIG. 2A and FIG. 2B are schematic diagrams illustrating how to determine an object and liquid, according to embodiments of the present invention. In FIG. 2A, the first sensing image Img_1, the second image Img_2 comprises regions marked by dotted lines, which mean bright regions in the images. As above-mentioned, the bright regions maybe caused by liquid or an obstacle. The autonomous cleaning device 100 first defines a first ROI R_1 corresponding to the obstacle image. Such first ROI R_1 can be regarded as the above-mentioned obstacle region. ROI means region of interest. Many methods can be applied to define the first ROI R_1. For example, the centroid of the bright regions can be computed and the first ROI R_1 is determined according to the centroid, since the obstacle image and the liquid image may have different shapes. Also, the first ROI R_1 can be determined according to shapes of the bright regions. After the first ROI R_1 is acquired in the second sensing image Img_2, the region corresponding to the first ROI R_1 in the first sensing image Img_1 is despite of computations and only the second ROI R_2 is computed to determine the liquid. Such second ROI R_2 can be regarded as the above-mentioned liquid region.

In the embodiment of FIG. 2A, the second sensing image Img_2 comprises the image generated by the second light L_2 (the image marked by slashes). For such embodiment, the second light L_2 may have a high light intensity, or the image sensor has a high sensitivity, or the transmitting direction of the second light L_2 is toward the surface Sr (i.e., the second light L_2 or the surface Sr tilts), thus the image sensor can sense the image generated by the second light L_2. However, in another embodiment, the second sensing image Img_2 does not comprise the image generated by the second light L_2, as illustrated in FIG. 2B. For such embodiment, the second light L_2 may have a low light intensity, or the image sensor has a low sensitivity, or the transmitting direction of the second light L_2 is leaving the surface Sr (i.e., the second light L_2 or the surface Sr tilts), thus the image sensor could not sense the image generated by the second light L_2. On the opposite, in both the embodiments of FIG. 2A and FIG. 2B, the first image Img_1 comprise the image generated by the first light L_1, since the emitting direction of the first light L_1 is toward the surface Sr.

After the liquid is determined, the autonomous cleaning device 100 can correspondingly operate. For example, if the liquid is determined and the autonomous cleaning device 100 has no liquid cleaning ability, the autonomous cleaning device 100 can avoid the liquid or generating a remind message to inform the user. On the opposite, if the liquid is determined and the autonomous cleaning device 100 has liquid cleaning ability, the autonomous cleaning device 100 can active the liquid cleaning mechanism to clean the liquid.

Please note, the sizes, the shapes and the locations of the first ROI R_1 and the second ROI R_2 are not limited to the examples illustrated in FIG. 2. Further, in the embodiment of FIG. 2, the first sensing image Img_1 and the second image Img_2 have the same image contents. However, the first sensing image Img_1 and the second image Img_2 may have different image contents due to different emitting directions of the first light L_1, the second light L_2, or due to time difference of emission of the first light L_1, the second light L_2.

Figure 3:
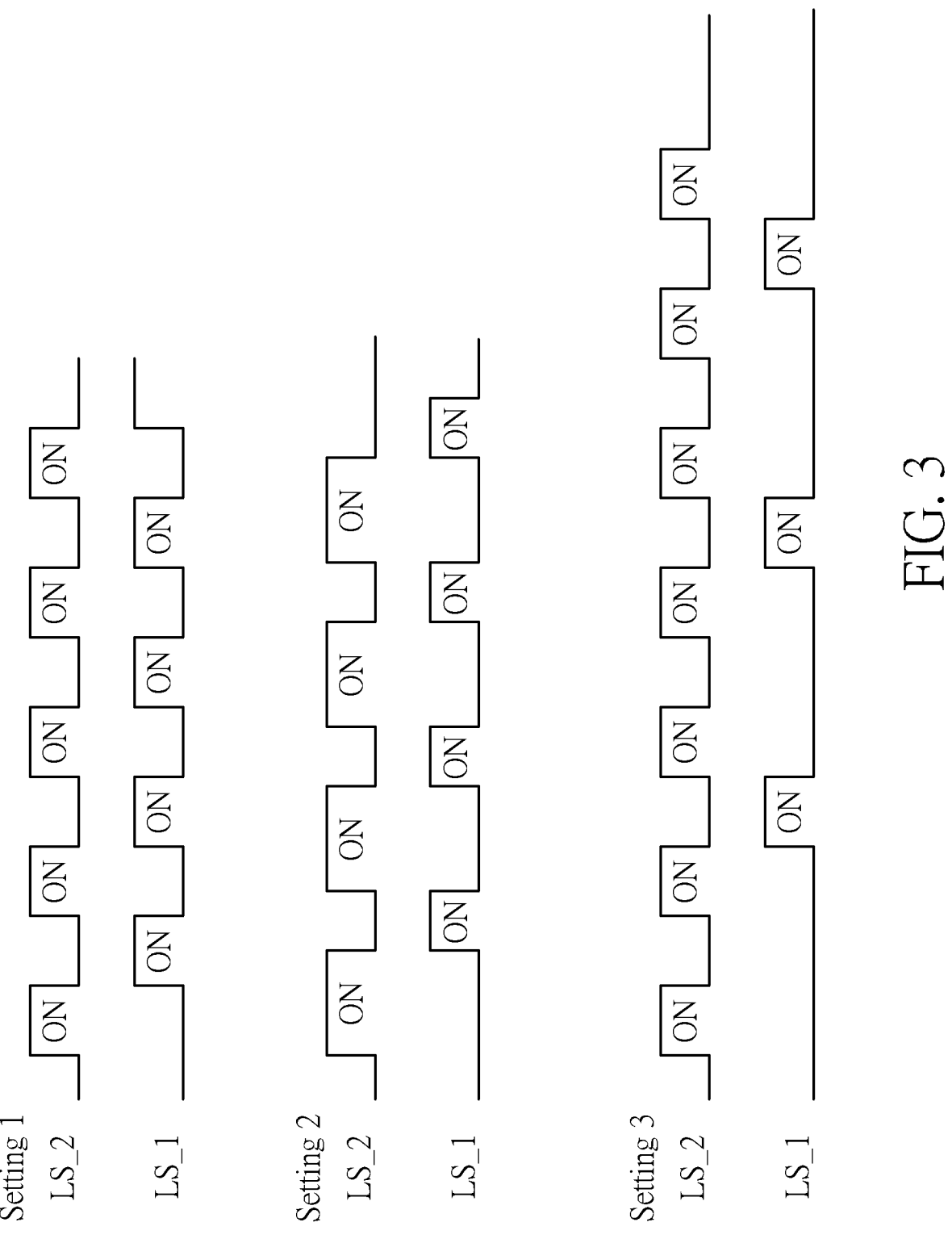
FIG. 3 is a schematic diagram illustrating the emitting time of the first light source and the second light source, according to different embodiments of the present invention.

The emitting time of the first light L_1, the second light L_2 can have various settings. FIG. 3 is a schematic diagram illustrating the emitting time of the first light source and the second light source, according to different embodiments of the present invention. In the embodiment of FIG. 3, the high logic level means the light source turns on thus emits light, and the low logic level means the light source turns off thus does not emit light.

As shown in FIG. 3, for Setting 1, the first light L_1 and the second light L_2 are alternately emitted, and emitting time intervals of each times of the first light L_1 and the second light L_2 are the same. For setting 2, the first light L_1 and the second light L_2 are alternately emitted as well, and emitting time intervals of each times of the second light L_2 is longer than which of the first light L_1. In other words, for Setting 2, the first light L_1 and the second light L_2 are alternately emitted, but the first light L_1 is emitted in a first time interval, and the second light L_2 is emitted in a second time interval larger than the first time interval.

For Setting 3, the second light L_2 is emitted for at least two times (two times in this embodiment) and then the first light L_1 is emitted for one time. Emitting time intervals of each times of the first light L_1 and the second light L_2 are the same. Such steps are repeated performed, as illustrated in FIG. 3. In one embodiment, the first light L_1 and the second light L_2 are simultaneously emitted. In such case, the first light L_1 and the second light L_2 have different wavelengths, and the image sensor 103 have different coatings such that different regions of the image sensor 103 can receive light with different wavelengths.

Figure 4:
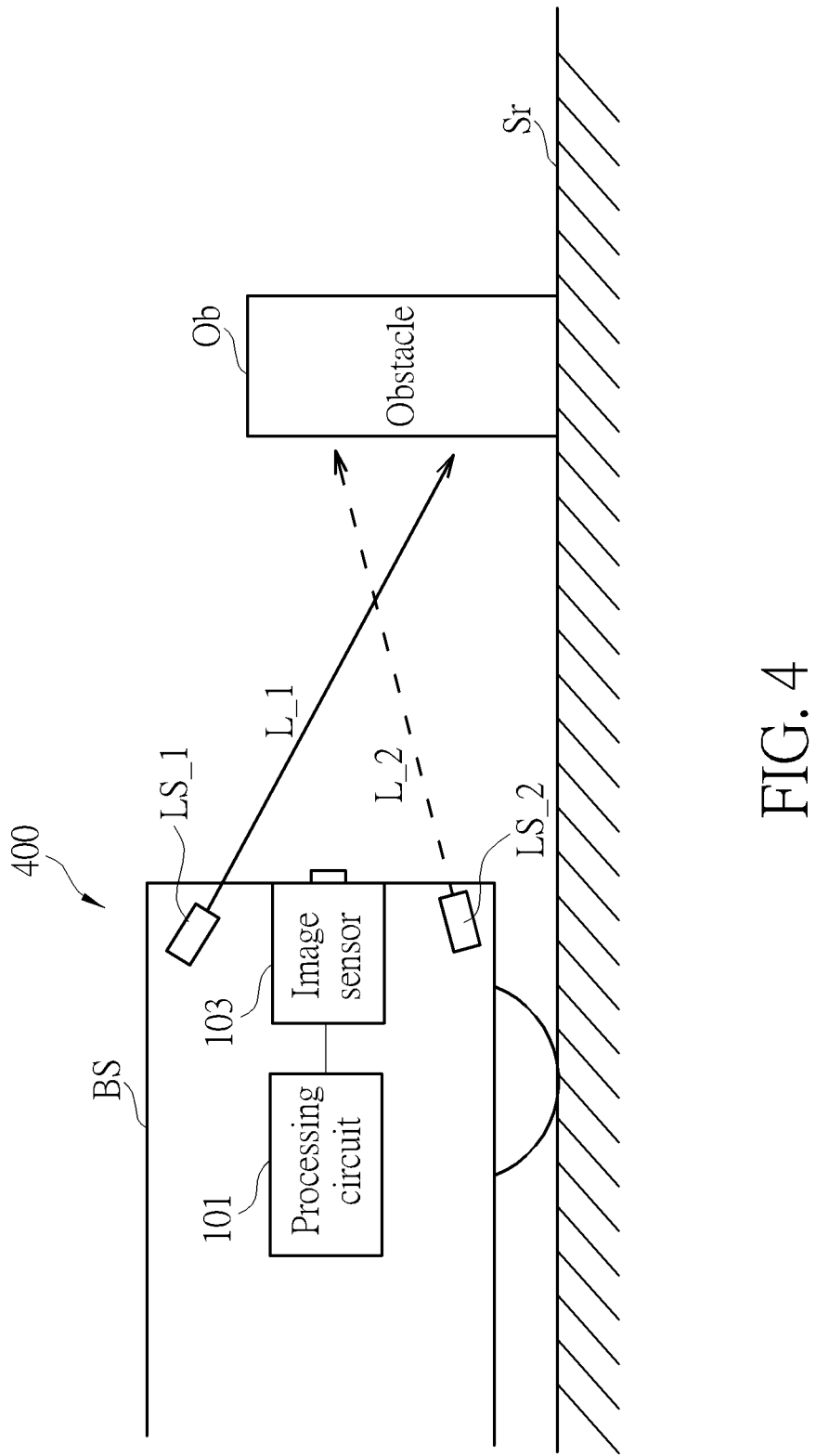
FIG. 4, FIG. 5 and FIG. 6 are schematic diagrams illustrating autonomous cleaning devices according to different embodiments of the present invention.
Figure 5:
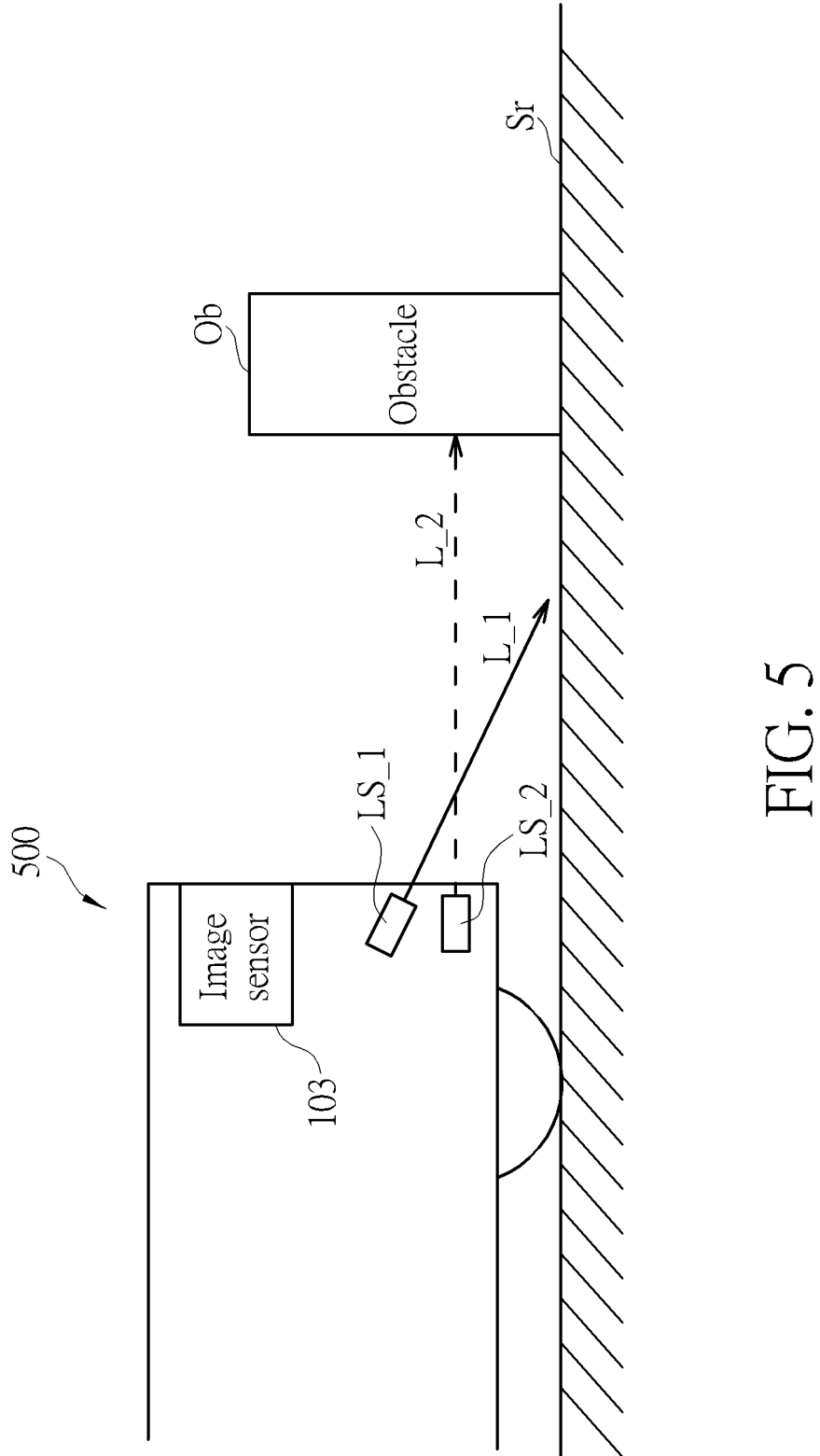
Figure 6:
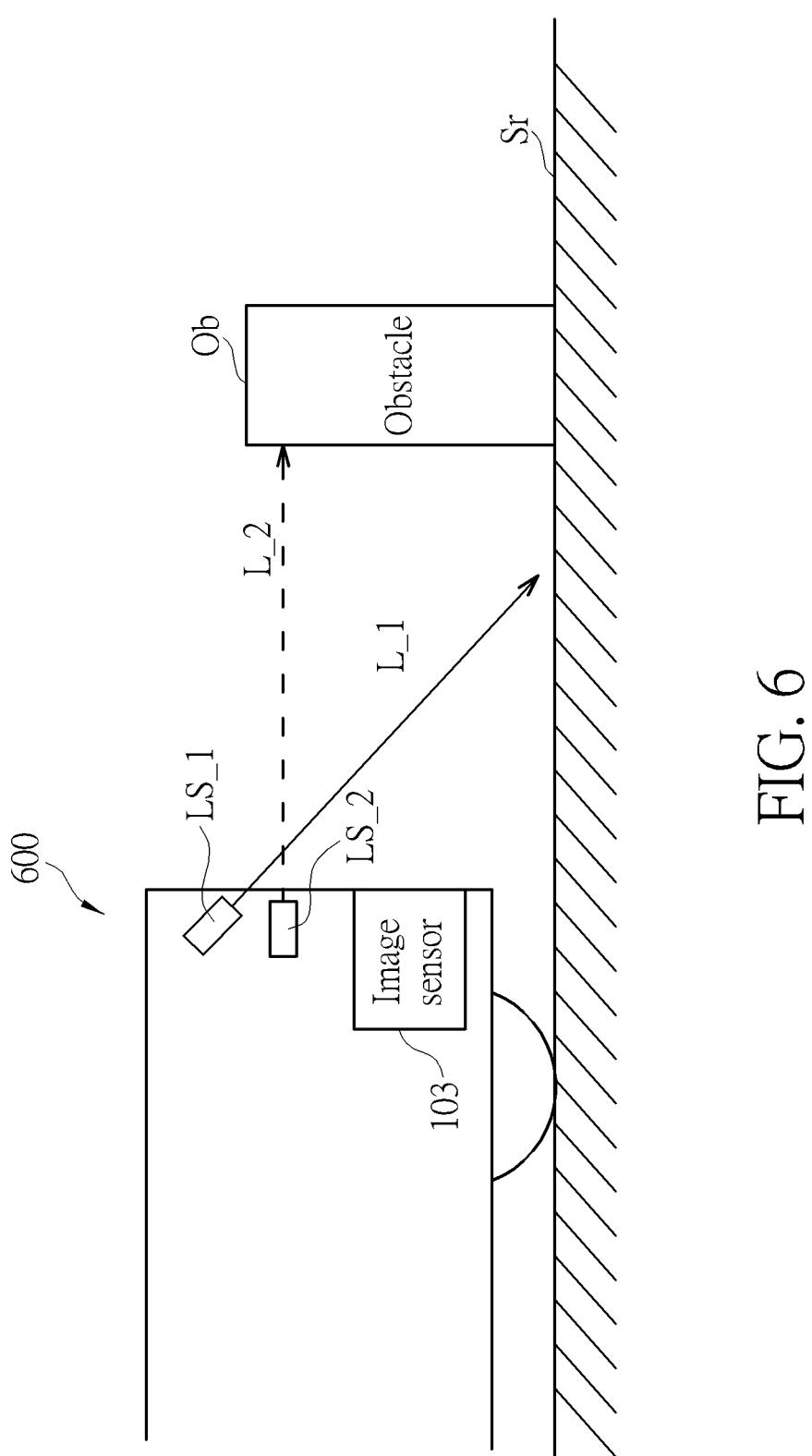

The locations and the emitting directions of the first light source LS_1 and the second light source LS_2 are not limited to the embodiment illustrated in FIG. 1. FIG. 4, FIG. 5 and FIG. 6 are schematic diagrams illustrating autonomous cleaning devices according to different embodiments of the present invention. In FIG. 4, the autonomous cleaning device 400 comprises components the same as which of the autonomous cleaning device 100 in FIG. 1. However, the emitting direction of the second light L_2 is leaving the surface Sr rather than parallel with the surface Sr. Also, in FIG. 5, the autonomous cleaning device 500 comprises components the same as which of the autonomous cleaning device 100 in FIG. 1. However, the first light source LS_1 and the second light source LS_2 are both below the image sensor 103. Additionally, in FIG. 6, the autonomous cleaning device 600 comprises components the same as which of the autonomous cleaning device 100 in FIG. 1. However, the first light source LS_1 and the second light source LS_2 are both above the image sensor 103. Please note, in the embodiments of FIG. 5 and FIG. 6, the emitting directions of the second light L_2 can be changed to leave the surface Sr.

Figure 7:
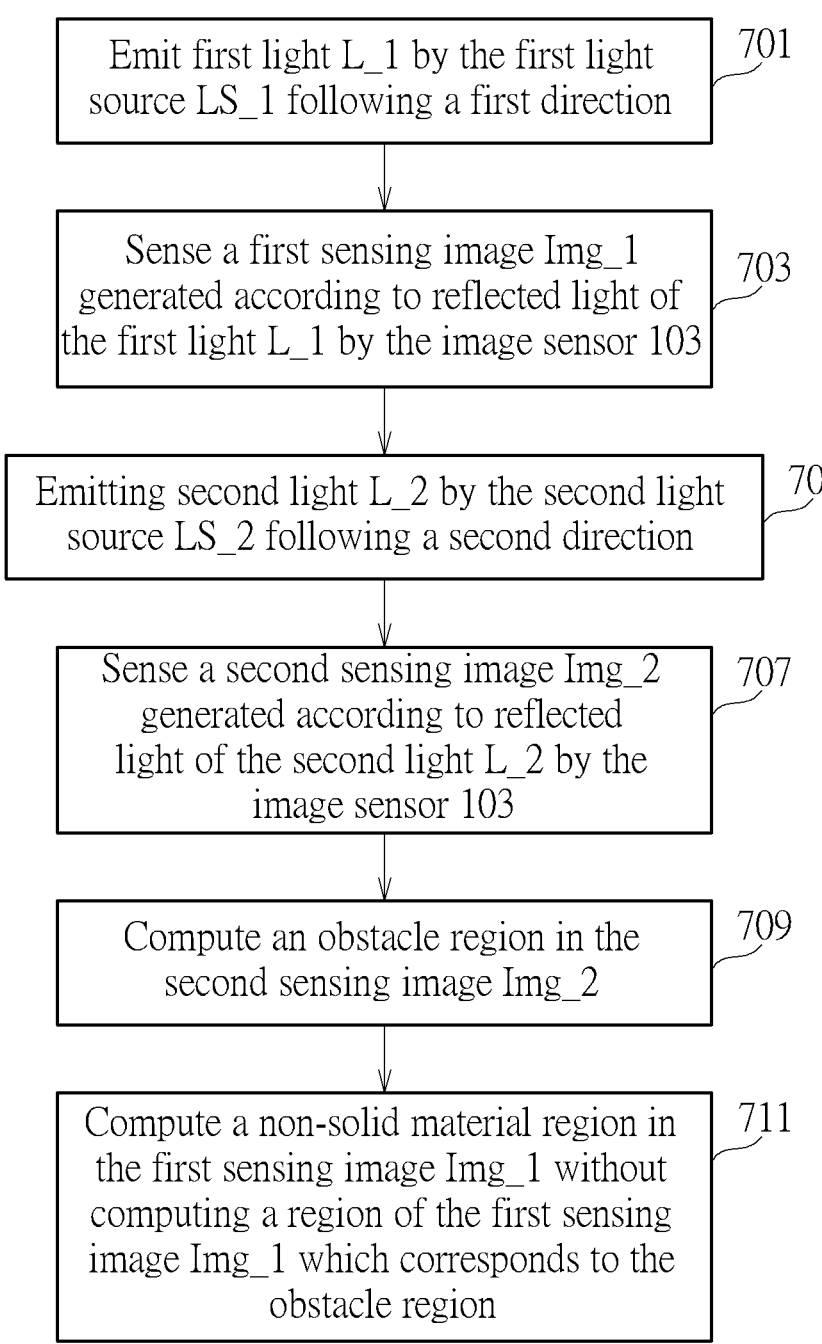
FIG. 7 is a flow chart illustrating a non-solid material detection method, according to one embodiment of the present invention.

In view of above-mentioned embodiments, a non-solid material detection method can be acquired, which is applied to a non-solid material detection device (e.g., autonomous cleaning device 100) comprising an image sensor, a first light source and a second light source. The detection method comprises following steps shown in FIG. 7. Please note, the sequence of these steps is only for example and does not mean to limit the scope of the present invention.

Step 701

Emit first light L_1 by the first light source LS_1 following a first direction.

Step 703

Sense a first sensing image Img_1 generated according to reflected light of the first light L_1 by the image sensor 103.

Step 705

Emitting second light L_2 by the second light source LS_2 following a second direction.

Step 707

Sense a second sensing image Img_2 generated according to reflected light of the second light L_2 by the image sensor 103.

Step 709

Compute an obstacle region (e.g., the first ROI RI 1 in FIG. 2) in the second sensing image Img_2.

Step 711

Compute a non-solid material region (e.g., the second ROI RI 2 in FIG. 2) in the first sensing image Img_1 without computing a region of the first sensing image Img_1 which corresponds to the obstacle region, as illustrated in the embodiment of FIG. 2.

In one embodiment, the non-solid material detection device is located on a surface Sr, the first direction is toward the surface and the second direction is leaving the surface or parallel with the surface.

Other detail steps are illustrated in above-mentioned embodiments, thus are omitted for brevity here.

The present invention also discloses a distance computing mechanism of an autonomous cleaning device. Please note although an autonomous cleaning device is taken as an example for explaining the concepts of the present invention, the distance computing mechanism provided by the present invention can also be applied to any other electronic device.

Figure 8:
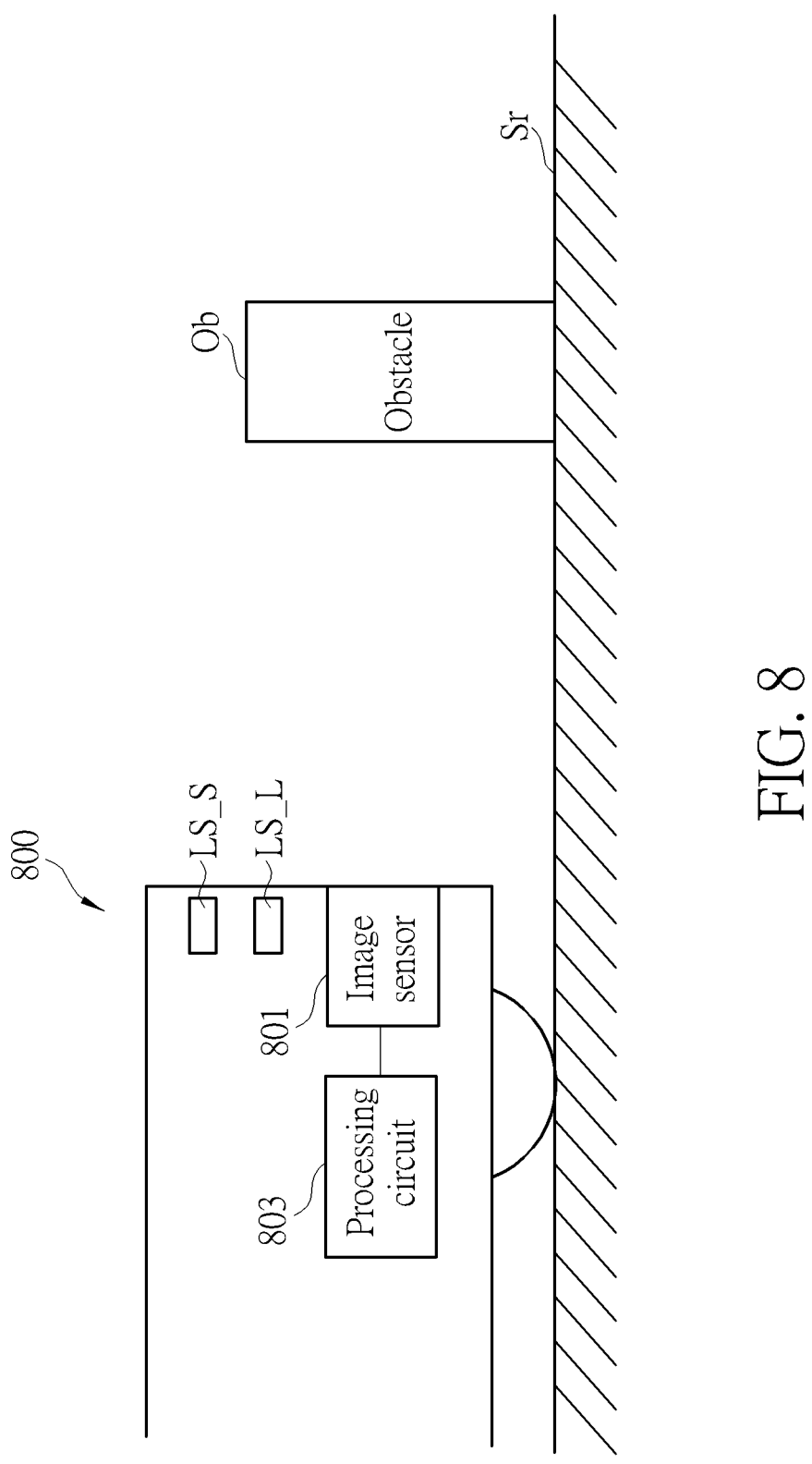
FIG. 8 is a schematic diagram illustrating an autonomous cleaning device according to another embodiment of the present invention.

FIG. 8 is a schematic diagram illustrating an autonomous cleaning device according to one embodiment of the present invention. As illustrated in FIG. 8, the autonomous cleaning device 800 comprises a surface light source LS_S, a line light source LS_L, an image sensor 801 and a process circuit 803. In one embodiment, the image sensor 801 is a SPAD (single photon avalanche diode) image sensor. Please note, the locations of the surface light source LS_S, the line light source LS_L, and the image sensor 801 are not limited to the embodiment illustrated in FIG. 8. The locations of these components can be changed corresponding to different requirements.

The surface light source LS_S is configured to emit surface light. The line light source LS_L is configured to emit line light. The image sensor 801 is configured to sense first sensing images generated according to reflected light of the surface light, and to sense second images generated according to reflected light of the line light. The processing circuit 803 is configured to compute a distance between the distance computing device 800 and an obstacle Ob according to the first sensing images or the second images. That is, the distance computing device 800 can compute the distance according to the first sensing images but not according to the second images, or according to the second images but not according to the first sensing images. In one embodiment, the processing circuit 803 uses a TOF principle while computing the distance according to the first sensing images and computes the distance according to image centroid shifting while computing the distance according to the second images.

Figure 9:
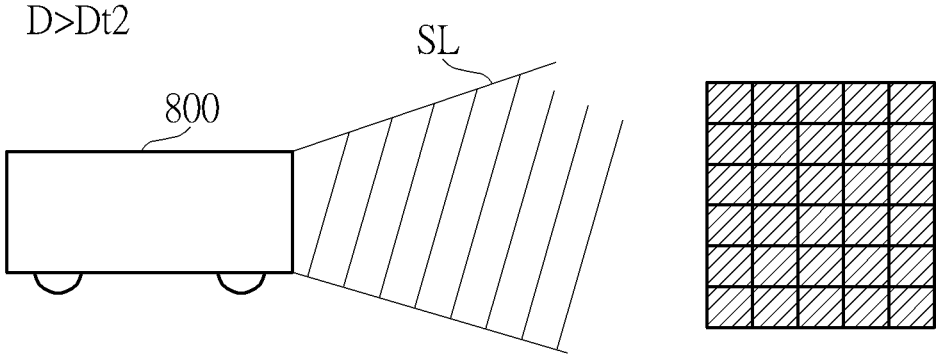
FIG. 9 is a schematic diagram illustrating how the autonomous cleaning device computes a distance, according to embodiments of the present invention.
Figure 9:
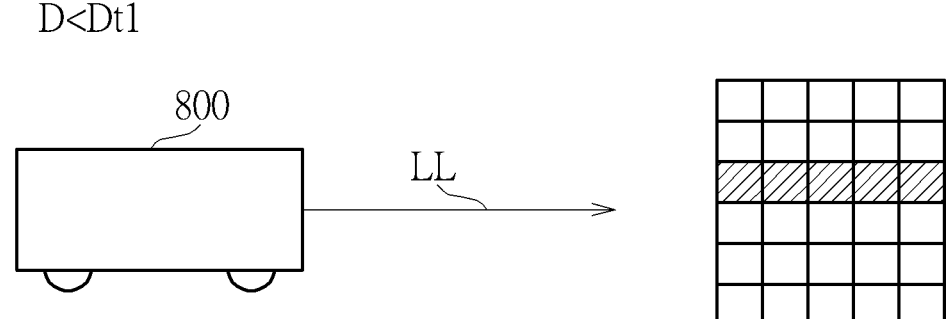

FIG. 9 is a schematic diagram illustrating how the autonomous cleaning device computes a distance, according to embodiments of the present invention. As illustrated in FIG. 9, in one embodiment, the autonomous cleaning device 800 initially uses the surface light SL to compute the distance, without using the line light LL. If the computed distance D is larger than a second threshold distance Dt2, the autonomous cleaning device 800 keeps using the surface light SL to compute the distance. Also, if the computed distance D is smaller than a first threshold distance Dt1, the autonomous cleaning device 800 switches to use the line light LL to compute the distance. The first threshold distance Dt1 and the second threshold distance Dt2 can be the same or different. In such case, the autonomous cleaning device 800 does not use the surface light SL to compute the distance. Also, if the computed distance D is larger than the second threshold distance Dt2 when the autonomous cleaning device 800 uses the line light source LL to compute the distance, the autonomous cleaning device 800 switches back to use the surface light source SL to compute the distance.

Please note, the switch sequence is not limited to the example illustrated in FIG. 9. For example, in one embodiment, the autonomous cleaning device 800 initially uses the line light LL to compute the distance, without using the surface light SL. If the computed distance D is larger than the second threshold distance Dt2, the autonomous cleaning device 800 switches to use the surface light SL to compute the distance, without using the line light LL.

The SPAD image sensor using the TOF principle can detect distances accurately when the autonomous cleaning device 800 is far from the obstacle Ob (i.e., D>Dt2). Also, the distance computed according to image centroid shifting is accurate when the autonomous cleaning device 800 is close to the obstacle Ob (i.e., D<Dt1). Therefore, the embodiment in FIG. 9 can provide accurate distance computation no matter the autonomous cleaning device 800 is far from the obstacle Ob or close to the obstacle Ob.

Besides, in the embodiments of FIG. 8 and FIG. 9, the emitting direction of the line light LL is parallel with the surface Sr. However, the emitting direction of the line light LL can be set to approach or leave the surface Sr, such as the first light L_1 and the second light L_2 shown in FIG. 4.

Figure 10:
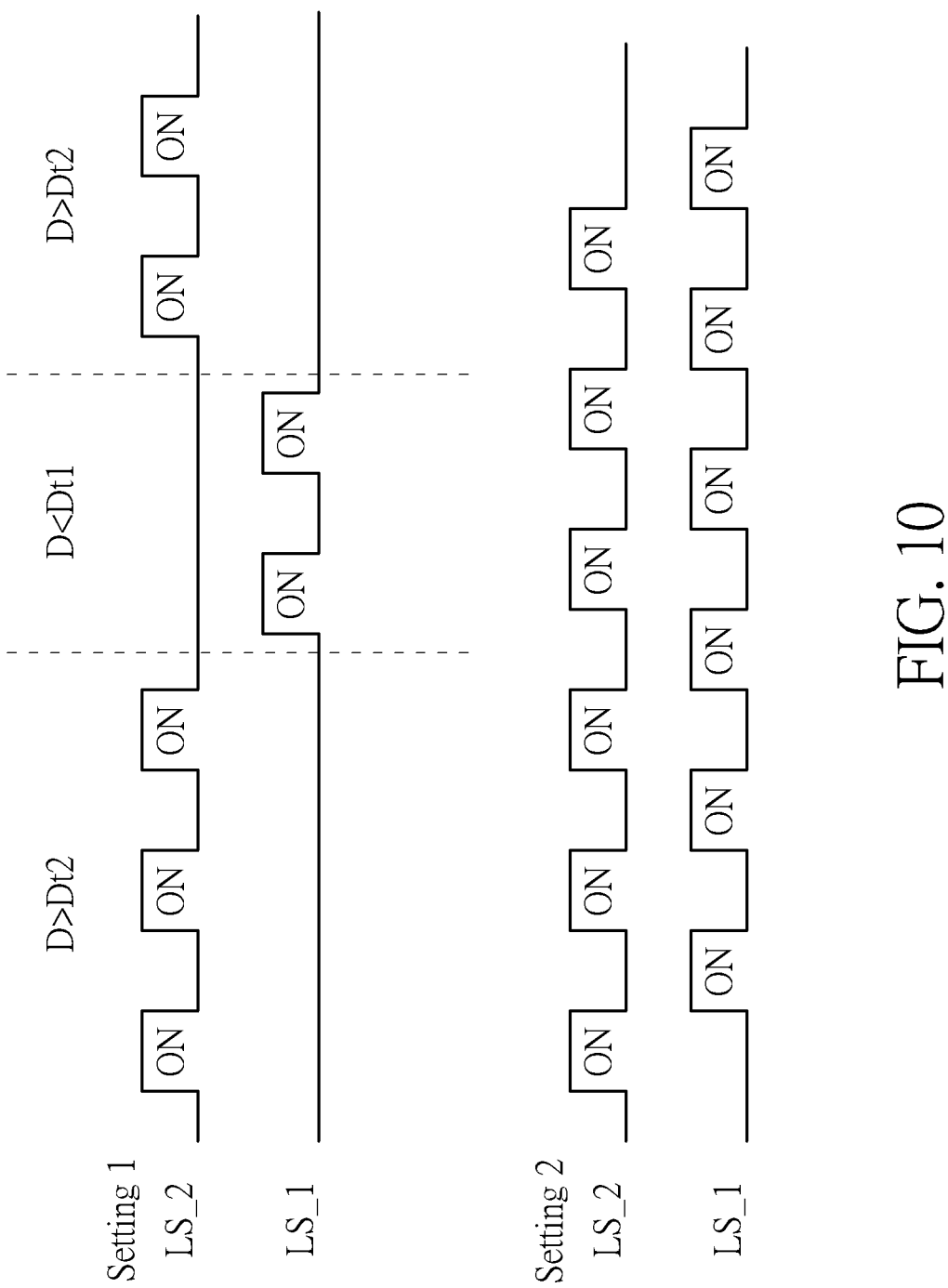
FIG. 10 is a schematic diagram illustrating the emitting time of the surface light source and the line light source, according to different embodiments of the present invention.

The switch of the surface light source LS_S and the line light source LS_L is not limited to the embodiment of FIG. 9. FIG. 10 is a schematic diagram illustrating the emitting time of the surface light source and the line light source, according to different embodiments of the present invention. In the embodiment of FIG. 10, the high logic level means the light source turns on thus emits light, and the low logic level means the light source turns off thus does not emit light. The Setting 1 corresponds to the embodiment in FIG. 9. That is, the surface light source LS_S turns on and the line light source LS_L turns off when the computed distance D is larger than the second threshold distance Dt2. On the opposite, the surface light source LS_S turns off and the line light source LS_L turns on when the computed distance D is smaller than the first threshold distance Dt1.

For Setting 2, the surface light source LS_S and the line light source LS_L alternately turns on. Also, in one embodiment, the surface light and the line light are simultaneously emitted. In such case, the surface light and the line light have different wavelengths and the different regions of the image sensor have different coatings. Thereby different regions of the image sensor can receive light with different wavelengths. In these cases, the final computed distance can be acquired based on the computed distances which are computed according to different light sources. For example, an average of the computed distances which are computed according to the surface light and the computed distances which are computed according to the line light can be used as the final computed distance.

Figure 11:
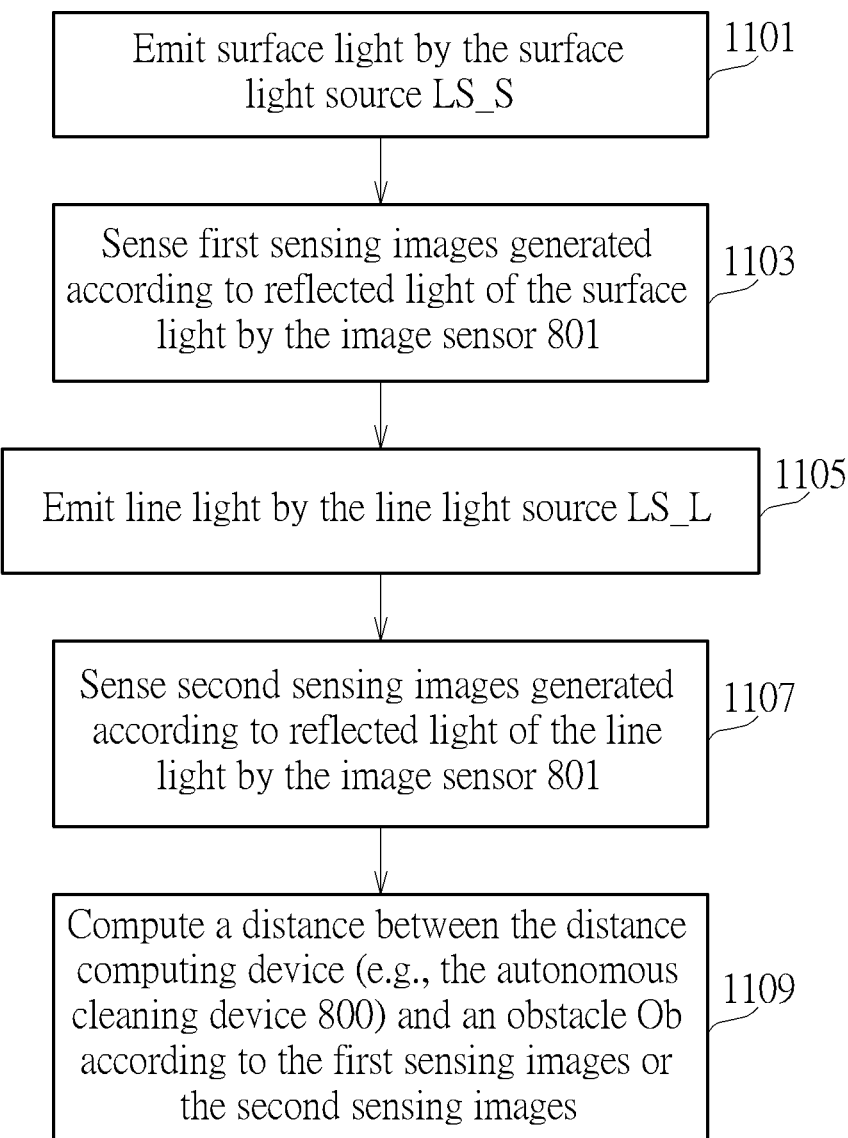
FIG. 11 is a flow chart illustrating a distance computing method, according to one embodiment of the present invention.

In view of above-mentioned embodiments, a distance computing method can be acquired, which comprises following steps illustrated in FIG. 11. Please note the sequence of the steps in FIG. 11 do not mean to limit the scope of the present invention.

Step 1101

Emit surface light by the surface light source LS_S.

Step 1103

Sense first sensing images generated according to reflected light of the surface light by the image sensor 801.

Step 1105

Emit line light by the line light source LS_L.

Step 1107

Sense second sensing images generated according to reflected light of the line light by the image sensor 801.

Step 1109

Compute a distance between the distance computing device (e.g., the autonomous cleaning device 800) and an obstacle Ob according to the first sensing images or the second sensing images.

Other detail steps can be acquired in view of the embodiments in FIG. 8, FIG. 9 and FIG. 10, thus are omitted for brevity here.

In view of above-mentioned embodiments, the liquid detection can be more accurate. Also, the distance can also be accurately computed even if the autonomous cleaning device is close to the obstacle.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-solid material detection method, applied to a non-solid material detection device comprising an image sensor, a first light source and a second light source, the detection method comprising:

emitting first light by the first light source following a first direction;

sensing a first sensing image generated according to reflected light of the first light by the image sensor;

emitting second light by the second light source following a second direction;

sensing a second sensing image generated according to reflected light of the second light by the image sensor;

computing an obstacle region in the second sensing image; and computing a non-solid material region in the first sensing image without computing a region of the first sensing image which corresponds to the obstacle region;

wherein the steps of emitting the first light and the second light comprises:

alternately emitting the first light and the second light;

wherein the steps of emitting the first light and the second light further comprises:

emitting the first light in a first time interval; and emitting the second light in a second time interval larger than the first time interval.

2. The non-solid material detection method of claim 1, wherein if the non-solid material detection device is located on a surface, the first direction is toward the surface and the second direction is parallel with the surface.

3. The non-solid material detection method of claim 1, wherein the non-solid material region comprises a liquid region or a colloid region.

4. A non-solid material detection device, comprising:

a processing circuit;

an image sensor;

a first light source, configured to emit first light following a first direction; and a second light source, configured to emit second light following a second direction;

wherein the processing circuit is configured to perform following steps:

controlling the image sensor to sense a first sensing image generated according to reflected light of the first light;

controlling the image sensor to sense a second sensing image generated according to reflected light of the second light; and computing an obstacle region in the second sensing image;

computing a non-solid material region in the first sensing image without computing a region of the first sensing image which corresponds to the obstacle region;

wherein the steps of emitting the first light and the second light comprises:

alternately emitting the first light and the second light;

wherein the steps of emitting the first light and the second light further comprises:

emitting the first light in a first time interval; and emitting the second light in a second time interval larger than the first time interval.

5. The non-solid material detection device of claim 4, wherein if the non-solid material detection device is located on a surface, the first direction is toward the surface and the second direction is parallel with the surface.

6. The non-solid material detection device of claim 4, wherein the non-solid material region comprises a liquid region or a colloid region.

7. The non-solid material detection device of claim 4, wherein the image sensor is located at a location that the image sensor can sense reflected light of the first light and the second light;

wherein the first light source is above the image sensor and the second light source is below the image sensor.

8. The non-solid material detection device of claim 4, wherein the image sensor is located at a location that the image sensor can sense reflected light of the first light and the second light;

wherein the first light source and the second light source are below the image sensor.

9. The non-solid material detection device of claim 4, wherein the image sensor is located at a location that the image sensor can sense reflected light of the first light and the second light;

wherein the first light source and the second light source are above the image sensor.

10. The non-solid material detection device of claim 4, wherein the non-solid material detection device is an autonomous cleaning device.

11. A non-solid material detection method, applied to a non-solid material detection device comprising an image sensor, a first light source and a second light source, the detection method comprising:

emitting first light by the first light source following a first direction;

sensing a first sensing image generated according to reflected light of the first light by the image sensor;

emitting second light by the second light source following a second direction;

sensing a second sensing image generated according to reflected light of the second light by the image sensor;

computing an obstacle region in the second sensing image; and computing a non-solid material region in the first sensing image without computing a region of the first sensing image which corresponds to the obstacle region;

wherein the steps of emitting the first light and the second light comprises:

repeatedly performing following steps:

emitting the second light for at least two times and then emitting the first light for one time.

12. A non-solid material detection device, comprising:

a processing circuit;

an image sensor;

a first light source, configured to emit first light following a first direction; and a second light source, configured to emit second light following a second direction;

wherein the processing circuit is configured to perform following steps:

controlling the image sensor to sense a first sensing image generated according to reflected light of the first light;

controlling the image sensor to sense a second sensing image generated according to reflected light of the second light; and computing an obstacle region in the second sensing image;

computing a non-solid material region in the first sensing image without computing a region of the first sensing image which corresponds to the obstacle region;

wherein the steps of emitting the first light and the second light comprises:

repeatedly performing following steps:

emitting the second light for at least two times and then emitting the first light for one time.

* * * * *